(12) United States Patent
Neise et al.

(10) Patent No.: US 8,314,524 B2
(45) Date of Patent: Nov. 20, 2012

(54) ELECTRICAL INTERNAL COMBUSTION ENGINE ACTUATING ARRANGEMENT

(75) Inventors: Ralf Neise, Berlin (DE); Thomas Schroeder, Berlin (DE)

(73) Assignee: Pierburg GmbH, Neuss (DE)

( * ) Notice: Subject to any disclaimer, the term of this patent is extended or adjusted under 35 U.S.C. 154(b) by 244 days.

(21) Appl. No.: 12/673,608

(22) PCT Filed: Jun. 20, 2008

(86) PCT No.: PCT/EP2008/057881
§ 371 (c)(1),
(2), (4) Date: Nov. 5, 2010

(87) PCT Pub. No.: WO2009/021767
PCT Pub. Date: Feb. 19, 2009

(65) Prior Publication Data
US 2011/0050012 A1   Mar. 3, 2011

(30) Foreign Application Priority Data
Aug. 16, 2007 (DE) .................. 10 2007 038 746

(51) Int. Cl.
*F01L 9/04* (2006.01)
*H02K 5/00* (2006.01)
*F02D 9/00* (2006.01)

(52) U.S. Cl. .............. 310/71; 123/339.25; 123/399; 439/828

(58) Field of Classification Search ............ 310/71; 439/828, 835, 850; 123/339.25, 339.26
See application file for complete search history.

(56) References Cited

U.S. PATENT DOCUMENTS

| 4,518,886 A | * | 5/1985 | Kaneyuki ............ 310/71 |
| 5,006,742 A | * | 4/1991 | Strobl et al. ............ 310/88 |
| 5,382,855 A | * | 1/1995 | Cousin ............ 310/71 |
| 5,672,818 A | | 9/1997 | Schaefer et al. |
| 5,986,368 A | * | 11/1999 | Wetzel et al. ............ 310/71 |
| 6,078,118 A | * | 6/2000 | Reinartz et al. ............ 310/89 |
| 6,204,582 B1 | * | 3/2001 | Keller et al. ............ 310/89 |

(Continued)

FOREIGN PATENT DOCUMENTS
DE   19525510 A1   1/1997
(Continued)

OTHER PUBLICATIONS

International Search Report mailed Nov. 21, 2008, which issued during the prosecution of corresponding International Patent Application No. PCT/EP2008/057881.

*Primary Examiner* — Burton Mullins
(74) *Attorney, Agent, or Firm* — Norman B. Thot

(57) ABSTRACT

An electrical internal combustion engine actuating arrangement includes a housing cover with a position sensor and a housing body having disposed therein an electric drive motor and an output shaft having a position transducer. The housing cover and the electric drive motor are connected via at least one electrical plug connection arrangement including a plug blade and an opposite plug clamp having a plug-in slot. The housing body and the housing cover include a positioning arrangement having a positioning pin and a positioning bore configured to receive the positioning pin. The at least one electrical plug connection arrangement includes, on a side of the plug clamp, a plug blade guide with a guide slot arranged in parallel with the plug-in slot and a plug-in axis of the positioning arrangement.

14 Claims, 3 Drawing Sheets

U.S. PATENT DOCUMENTS

| | | |
|---|---|---|
| 6,264,493 B1 * | 7/2001 | Loibl et al. .................... 439/404 |
| 6,279,535 B1 * | 8/2001 | Matsusaka .................... 123/399 |
| 6,288,534 B1 * | 9/2001 | Starkweather et al. .... 324/207.2 |
| 6,502,544 B2 * | 1/2003 | Kubota et al. ................ 123/396 |
| 6,522,038 B2 * | 2/2003 | Byram ............................ 310/71 |
| 6,550,873 B1 * | 4/2003 | Hengler et al. ............ 303/119.3 |
| 6,622,698 B2 * | 9/2003 | Hayashida .................... 123/399 |
| 6,701,892 B2 * | 3/2004 | Wayama et al. .............. 123/399 |
| 6,845,963 B2 * | 1/2005 | Chini et al. .............. 251/129.11 |
| 6,871,529 B2 * | 3/2005 | Schroder .................... 73/114.36 |
| 6,966,296 B2 * | 11/2005 | Miyazaki et al. ............. 123/399 |
| 6,974,119 B2 * | 12/2005 | Brendle et al. ........... 251/129.11 |
| 7,211,914 B2 * | 5/2007 | Hofmann et al. ................ 310/88 |
| 7,579,728 B2 * | 8/2009 | Guttenberger ................ 310/71 |
| 7,990,001 B2 * | 8/2011 | Hatano et al. .................. 310/71 |
| 2004/0129252 A1 | 7/2004 | Wayama et al. |
| 2006/0266329 A1 | 11/2006 | Irihune et al. |
| 2007/0113824 A1 | 5/2007 | Keefover et al. |
| 2010/0263618 A1 * | 10/2010 | Keefover et al. ........... 123/190.1 |

FOREIGN PATENT DOCUMENTS

| | | |
|---|---|---|
| DE | 102004047991 A1 | 6/2005 |
| DE | 102004053703 A1 | 5/2006 |
| DE | 602004003107 T2 | 5/2007 |
| EP | 1321648 A2 | 6/2003 |
| EP | 1475525 A2 * | 11/2004 |
| EP | 1655579 A1 | 5/2006 |
| EP | 1669573 A2 | 6/2006 |
| JP | 2004-077472 A * | 3/2004 |
| JP | 2006-097627 A * | 4/2006 |

* cited by examiner

ELECTRICAL INTERNAL COMBUSTION ENGINE ACTUATING ARRANGEMENT

CROSS REFERENCE TO PRIOR APPLICATIONS

This application is a U.S. National Phase application under 35 U.S.C. §371 of International Application No. PCT/EP2008/057881, filed on Jun. 20, 2008 and which claims benefit to German Patent Application No. 10 2007 038 746.8, filed on Aug. 16, 2007. The International Application was published in German on Feb. 19, 2009 as WO 2009/021767 A1 under PCT Article 21(2).

FIELD

The present invention refers to an electrical internal combustion engine actuating arrangement comprising a housing body accommodating an electric drive motor and an output shaft with a position transducer, and a housing cover comprising a position sensor.

BACKGROUND

Prior actuating arrangements include at least one electrical plug connection arrangement electrically connecting the housing cover, on the one hand, and the drive motor, on the other hand. The electrical plug connection arrangement is formed by a plug blade, on the one hand, and an opposite plug clamp having a plug-in slot, on the other hand.

The actuating arrangement is used in motor vehicles driven by internal combustion engines to adjust actuators such as throttle valves, tumble valves, swirl flaps or switching flaps, the actuators either being arranged directly on the drive shaft of the drive motor or being connected indirectly with the output shaft of the drive motor through a transmission, through levers or linkages.

DE 10 2004 053 703 A1 describes an actuating arrangement with a contactless angle sensor system formed, on the one hand, by permanent magnets configured as position transducers on the output shaft of the actuating arrangement and, on the other hand, a hall sensor configured as a position sensor on the housing cover. The output shaft of the actuating arrangement is supported at the housing cover.

Such a contactless angle sensor system is very sensitive with respect to the exact position of the position transducer relative to the position sensor. The orientation of the housing cover with the housing body is achieved during the assembly by means of fastening elements for the fastening of the housing cover to the housing body, for example, by means of screws in bores, and/or by means on the output shaft or, if provided, further shafts of the transmission engaging into corresponding positioning bores in the housing cover. However, these positioning elements are rather far away from the position sensor so that an exact reproducible positioning of the position sensor is not guaranteed. The fastening elements are suitable only to a limited extent for positioning purposes since they are inherently inaccurate. Even a deviation of the position sensor of a few tenths of a millimeter from its rated position can cause deviations in the sensor signals that cannot be compensated. Using the shafts for an exact positioning of the housing cover increases the friction of the shafts and the risk of distorting a shaft during assembly.

When joining the housing cover and the housing body, the plug connection arrangement or the plug connection arrangements electrically connecting the drive motor with the housing cover must also be joined and contacted. Due to existing tolerance deviations, the plug blade often is not in exact alignment with the plug-in slot of the plug clamp. When plugging the plug blade into the plug-in slot, the plug blade and/or the plug clamp having the plug-in slot may be distorted. In the worst case, the clamping of the plug blade in the plug-in slot is no longer guaranteed or the contact is achieved only on one side, whereby it becomes susceptible in particular to vibrations.

SUMMARY

An aspect of the present invention is to provide an actuating arrangement whose position sensor is positioned precisely during assembly and which has a good contact between the drive motor and the housing cover.

In an embodiment, the present invention provides an electrical internal combustion engine actuating arrangement with a housing cover with a position sensor and a housing body having disposed therein an electric drive motor and an output shaft having a position transducer. The housing cover and the electric drive motor are connected via at least one electrical plug connection arrangement including a plug blade and an plug clamp having a plug-in slot. The housing body and the housing cover include a positioning arrangement having a positioning pin and a positioning bore configured to receive the positioning pin. The at least one electrical plug connection arrangement includes, on a side of the plug clamp, a plug blade guide with a guide slot arranged in parallel with the plug-in slot and a plug-in axis of the positioning arrangement.

BRIEF DESCRIPTION OF THE DRAWINGS

The present invention is described in greater detail below on the basis of embodiments and of the drawings in which.

DETAILED DESCRIPTION

Figure 1:
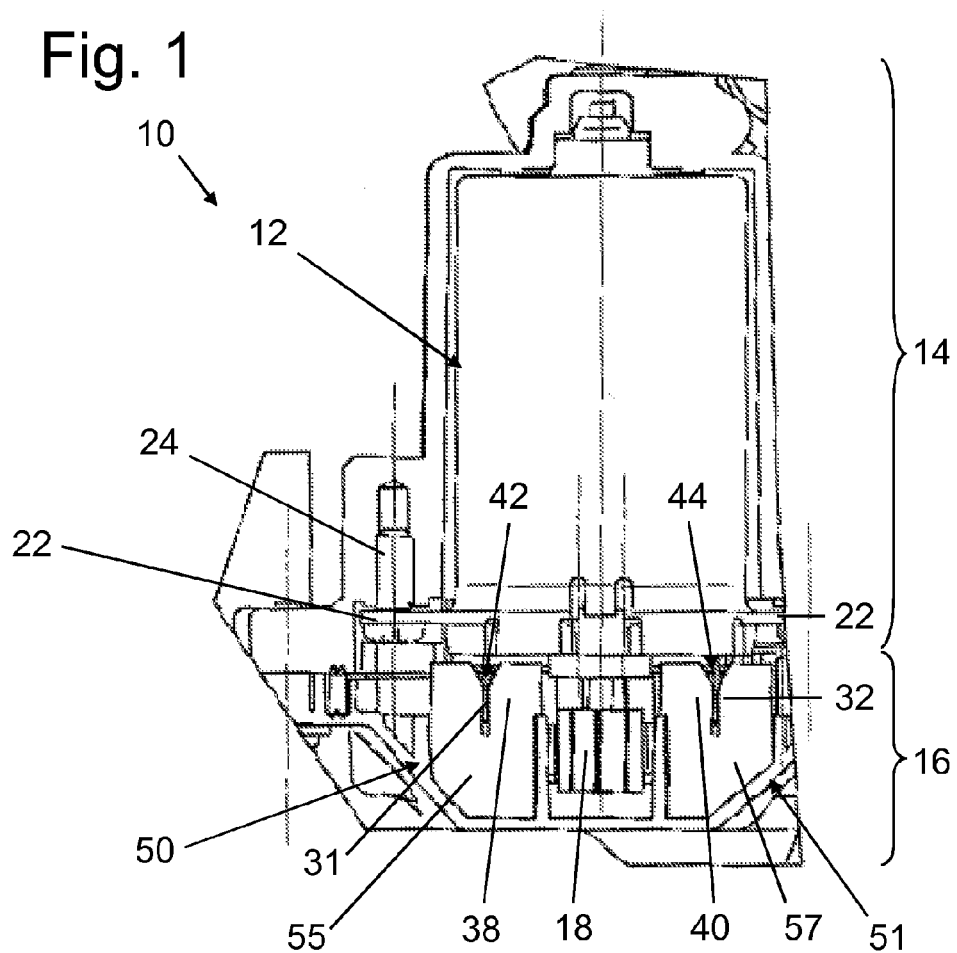
FIG. 1 is a longitudinal section of a complete electrical internal combustion engine actuating arrangement.
Figure 2:
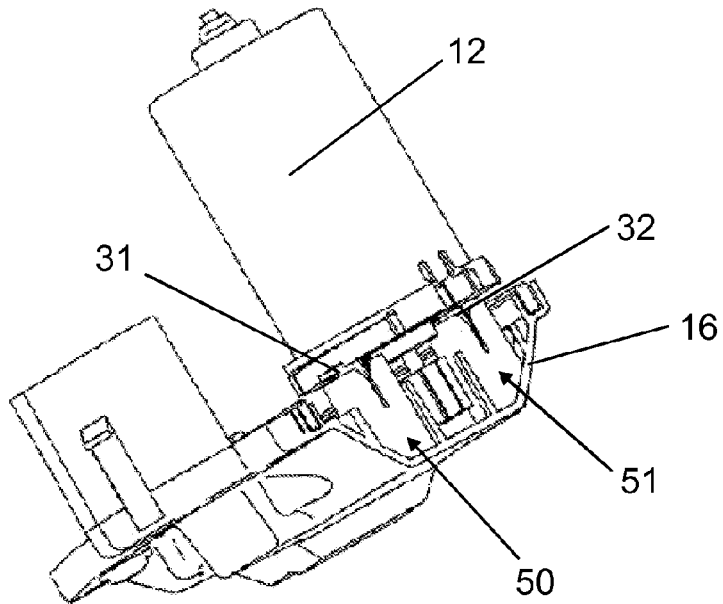
FIG. 2 illustrates a housing cover and an electric drive motor of the actuating device of FIG. 1.

The actuating arrangement of the present invention is provided with a separate positioning arrangement that has no secondary function and is arranged as close as possible to the position sensor of the housing cover. By omitting the secondary function, the positioning arrangement can be designed with sole consideration to its essential functions, namely high positional accuracy and high assembly reliability. The positioning arrangement is formed by a positioning pin, on the one hand, for example, on the cover, and a positioning bore, on the other hand, for example, in the housing body. The plug-in axis of the positioning arrangement is parallel to the plug-in axis of the plug arrangement. Neither the fastening elements nor the output shaft or other shafts of the transmission have a positioning function so that these components can be designed exclusively with consideration to their respective primary function.

Since it has no secondary functions, the positioning arrangement can be arranged in closest proximity of the position sensor so that a high positioning accuracy and reproducibility can be obtained thereby as well. This is of great importance, especially with contactless position sensors that generally are very position sensitive.

The fixing of the housing cover at the housing in the plane of the opening is several times hyperstatic, namely by the fastening elements, the positioning arrangement and one or two plug connection arrangements. This causes the risk of bending or damaging the plug connection arrangement during assembly because of the mechanical resilience thereof.

At the plug clamp, the plug arrangement comprises a separate plug blade guide with a guide slot that is arranged in parallel with the plug-in slot of the plug clamp. Guiding and positioning the plug blade need no longer be effected by the plug clamp, but is achieved by the separate plug blade guide fixedly associated to the plug clamp. In this manner, guiding and holding forces are largely kept away from the plug clamp so that corresponding deformations of the plug clamp and the plug blade are also permanently excluded.

The guiding function and the contact function of the plug connection arrangement are no longer incorporated in one component, but are performed by separate components. In this manner, both the guiding function and the contact function can be optimized without directly affecting or impairing the respective other function.

The guide slot in the plug blade guide realizes a defined forced orientation of the plug blade. The forced orientation of the plug blade is effected by the separate plug blade guide already before the contacting of the plug clamp. The separate plug blade guide facilitates assembly, reduces the error rate upon assembly, and improves the strength and quality of the electric connection between the plug blade and the plug clamp.

The positioning arrangement is, for example, arranged closer to the position sensor than to the plug connection arrangement. Since the position of the housing cover is also determined by the plug connection arrangement which, however, has a long tolerance chain, the positioning arrangement should be placed as far away from the plug connection arrangement as possible and as close to the position sensor as possible, for example, at least twice as close to the position sensor.

In an embodiment of the present invention, the positioning pin sits in the positioning bore in a force fit engagement. A defined fit of the positioning pin in the positioning bore can thereby result.

The positioning pin can, for example, be at least triangular in cross section and the positioning bore can be circular in cross section. Thus, upon insertion in force fit, material of the positioning pin and/or in the positioning bore can be displaced in the area of the edges and a defined and rigid fit of the positioning pin in the positioning bore can result.

One guide can, for example, be provided on either longitudinal side of the plug clamp, respectively, for example, the plug-in slot can be arranged between two parallel guide slots. The plug-in slot and the two guide slots are situated in a plane that is perpendicular to the plane of the opening. Thus, upon insertion into the plug-in slot of the plug clamp, the plug blade can also be guided with respect to rotation about the longitudinal axis, for example, about the plug-in axis, by the two guide slots of the two plug blade guides. When the plug blade can be guided by two plug blade guides, the plug blade is clearly guided such that it can be inserted or plugged exactly into the plug-in slot of the plug clamp.

In an embodiment of the present invention, the guide slot can be formed by a guide body formed integrally with the housing cover or the housing body. The housing cover and the housing body are, for example, made of plastics so that the guide body can be formed integrally to the housing cover or the housing body without much extra effort.

In an embodiment of the present invention, the guide body can have an insertion funnel at its distal guide slot end. The insertion funnel may be realized as insertion chamfers at the distal insertion end of the guide slot. This facilitates the insertion of the plug blade into the guide slot or into the guide slots. A blind assembly can thus be considerably facilitated, for example, an assembly where the assembly worker or a respective machine is unable to see the plug arrangement in the process of assembly.

The guide slot can, for example, protrude distally beyond the plug-in slot. The plug blade can thus always be introduced first into the guide slot and be inserted into the plug-in slot only thereafter. The forced orientation of the plug blade can thereby be effected before the plug blade reaches the plug-in slot and electric contacting occurs.

In an embodiment of the present invention, the width of the blade can, for example, be larger than the distance between the two outer slots. The width of the blade can thus be at least as large as the outer distance of the guide slot to the plug-in slot, if a single plug blade guide is provided, or as large as the outer distance between the two guide slots, if two plug blade guides are provided. The plug blade can thereby be both guided by the guide slot or the guide slots and inserted into the plug-in slot of the plug clamp. The larger the width of the blade with respect to the slot distance, the safer the insertion even in case of a lateral offset of the plug blade.

The width of the guide slot can, for example, be larger than 0.85 times the thickness of the plug blade, such as larger than 1.0 times. Depending on the requirement profile, the width of the guide slot or of the guide slots in the plug blade guide may be smaller than 1.0 times the plug blade thickness. In this case, the plug blade can be clamped in the guide slot or the guide slots. It is true that, by a better force fit engagement, the plug blade can be fixed better and the electrical connection can be less sensitive to vibrations during operation, however, at the same time, the assembly, especially the insertion of the plug blade into the guide slots and the plug-in slot, can be made more difficult.

A guide slot width can, for example, be more than 1.0 times the plug blade thickness, such as a guide slot width of less than 1.3 times the plug blade thickness. Within this range, a minimum play of the plug blade in the guide slot or the guide slots is accepted. However, the insertion into the guide slots is free of jamming and therefore shows little friction overall.

It is basically possible in motor vehicles to connect an electrical drive motor to ground, on the one hand, and to operate it using a single further electric terminal. The electrical drive motor may be accommodated within a gas- and liquid-tight housing that is entirely made of plastics. Two plug arrangements are, for example, provided for the electrical connection of the drive motor.

In an embodiment of the present invention, the plug clamp or the plug clamps is/are provided on the side of the housing cover and the plug blade or the plug blades is/are provided on the side of the drive motor.

Figure 6:
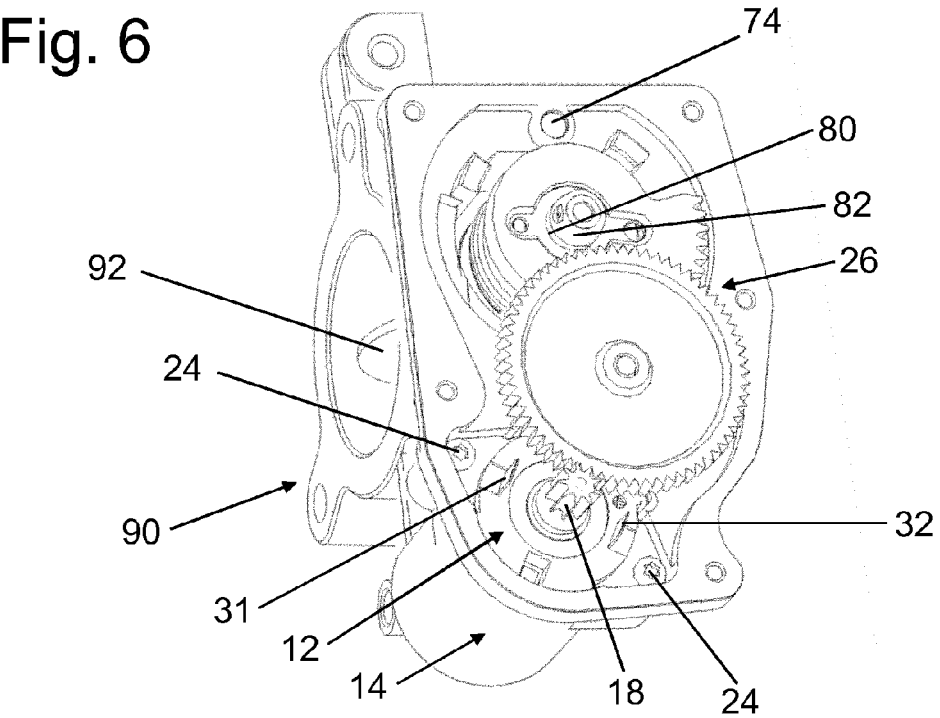
FIG. 6 is a perspective illustration of the actuating arrangement without cover, mounted to an actuator element arrangement.

FIG. 1 illustrates a complete electrical actuating arrangement 10 for internal combustion engines in longitudinal section. The actuating arrangement 10 serves, for instance, to adjust actuators of an internal combustion engine, for example, to adjust throttle valves, tumble valves, swirl flaps or switching flaps. FIG. 6 illustrates an actuator arrangement 90 with a throttle valve as the actuator 92. The actuator 92 may be arranged directly on the output shaft of the electric motor 12, but, as in the present case, it may also be driven indirectly through a transmission 26 having an output shaft 80.

The actuating arrangement 10 comprises a gas- and fluid-tight housing formed by a complex aluminum housing body 14 and a plastics housing cover 16 closing the opening side of the housing body 14. The electric drive motor 12 with an output pinion 18 is situated in the housing body 14. The output pinion 18 drives the output shaft 80 on the side of the housing body via the transmission 26 on the side of the housing body, the free end of the output shaft being provided with a position transducer 82 configured as a permanent-magnetic annular body.

Figure 3:
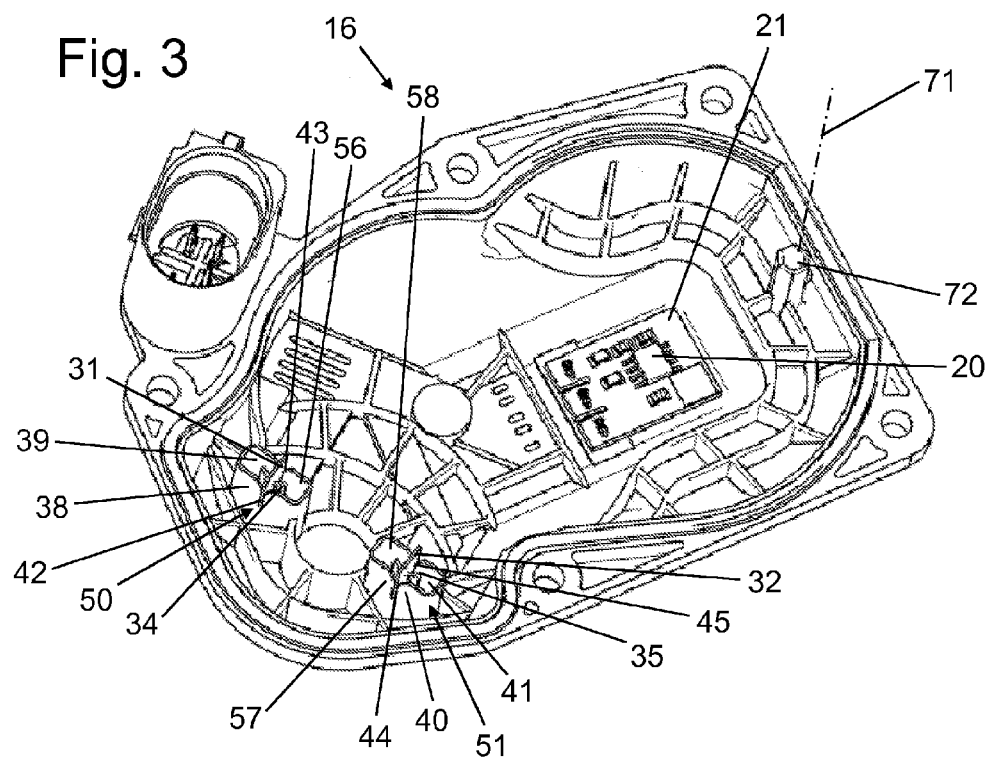
FIG. 3 is a top plan view on the inner side of the housing cover in FIG. 2.
Figure 4:
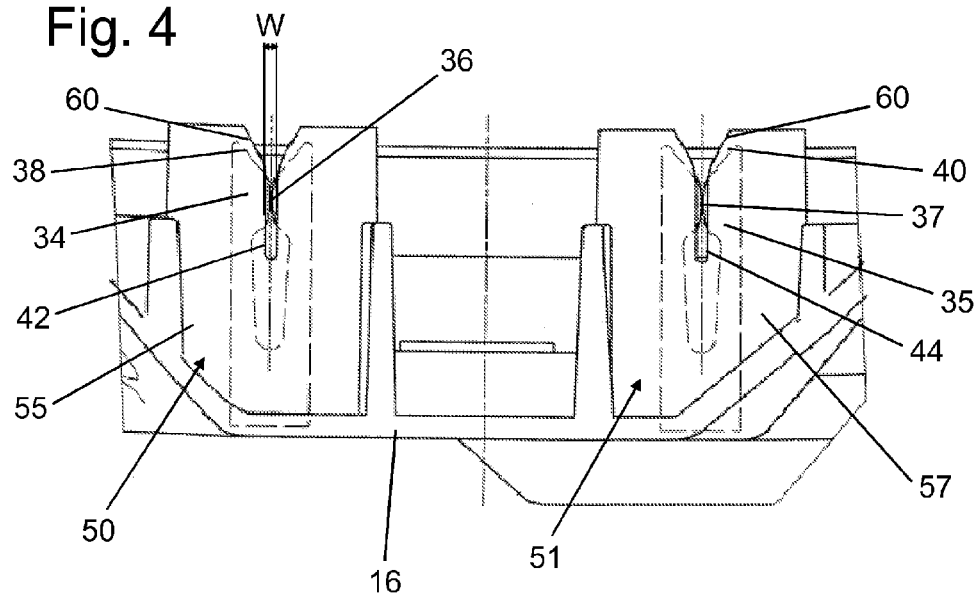
FIG. 4 shows an enlarged lateral view of the two plug connection arrangements in the housing cover of FIG. 3.
Figure 5:
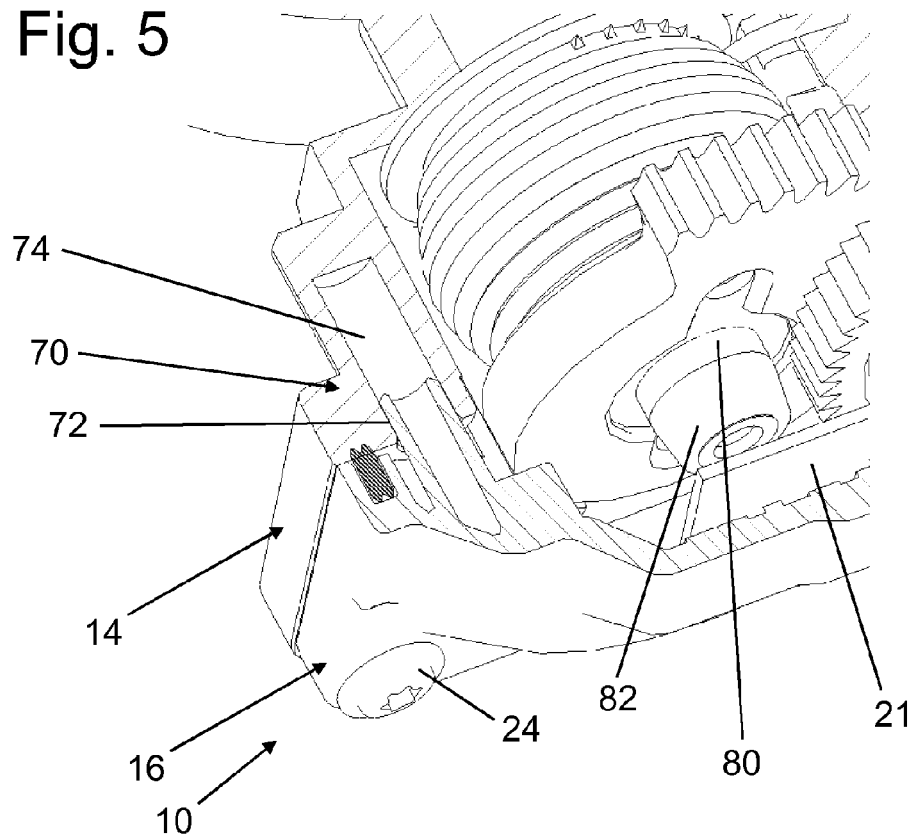
FIG. 5 is a section through the actuating device comprising the positioning arrangement, the position transducer and the position sensor.

As illustrated in FIG. 3, a Hall sensor is arranged as a position sensor 20 on a circuit board 21 on the inner side of the housing cover 16. The circuit board is arranged on the inner side of the housing cover 16. The position sensor 20 detects the rotary position of the output shaft 80 of the actuating arrangement by evaluating the magnetic field generated by the magnetic position transducer 82.

The drive motor 12 comprises a flange 22 with two fastening bores through which fastening screws 24 are screwed for the fastening of the drive motor 12 to or in the housing body 14. After the assembly of the drive motor 12 and the pre-assembly of the transmission 26 in the housing body 14, as well as the assembly of the circuit board 21 with the position sensor 20 in the housing cover 16, the opening of the housing body 14 is closed with the housing cover 16.

The housing body 14 and the housing cover 16 show a positioning arrangement 70 formed by a hexagonal positioning pin 72 on the side of the cover and a cylindrical positioning bore 74 on the side of the housing body. The positioning pin 72 is formed integrally with the housing cover 16 and is seated without play in a force fit engagement in the positioning bore 74. The positioning arrangement 70 is arranged as close as structurally possible to the position sensor 20 and as far away as possible from the plug connection arrangements 50, 51. In the present instance, the positioning arrangement 70 is arranged approximately beyond the plug connection arrangements 50, 51 with respect to the position sensor 20 and is spaced about 2 cm from the same.

When mounting the housing cover 16 to the housing body 14, the positioning pin 72 is first set into the positioning bore 74 in the direction of the plug-in axis 71. Thereafter or at the same time, two metal plug blades 31, 32 are inserted into corresponding metal plug clamps 34, 35 on the side of the housing cover. For this purpose, the plug clamps 34, 35 each have a plug-in slot 36, 37. The plug blade 31, 32 is inserted with its datum plane rotated by 90° with respect to the datum plane of the plug clamp 34, 35.

Two plug blade guides 38, 39, 40, 41 are respectively arranged in parallel with the plug clamps 34, 35, each guide having a respective guide slot 42, 43, 44, 45. A plug blade 31, 32, an associated plug clamp 34. 35, as well as the respective associated plug blade guides 38, 39, 40, 41 respectively form a plug connection arrangement 50, 51.

For the sakes of a better understanding, FIG. 3 shows the plug blades 31, 32 without the drive motor 12.

The width of the plug blades 31, 32 is about 4 mm. The distance between the outer sides of the mutually corresponding guides 38, 39 of a plug connection arrangement 50, 51 is about 4 mm. The width W of the guide slot 42, 43, 44, 45 is about 1.1 times the thickness of the plug blades 31, 32. The plug blades 31, 32 are thus guided in the guide slots 42 to 45 with little play and almost without resistance.

Each guide slot 42 to 45 protrudes distally beyond the plug-in slot 36, 37. Thus, it is guaranteed that upon the insertion of the plug blades 31, 32 into the plug connection arrangements 50, 51, an orientation with the plug-in slots 36, 37 is effected by the plug blade guides 38, 39, 40, 41 before the plug blades 31, 32 enter the plug-in slots 36, 37. Each of the plug blade guides 38, 39, 40, 41 has a V-shaped insertion funnel 60 facilitating the insertion of the plug blades 31, 32 into the guide slots 42 to 45.

The plug blade guides 38 to 41 are each formed by guide bodies 55, 56, 57, 58 that are made of plastics and are formed integrally with or to the housing lid 16. The guide bodies 55 to 58 are connected at their transverse sides by a transverse wall, respectively, so that the guide bodies 55, 56 and their associated transverse walls each form a plug housing closed on four sides and slit in the transverse direction.

The present invention is not limited to embodiments described herein; reference should be had to the appended claims.

The invention claimed is:

1. An electrical internal combustion engine actuating arrangement comprising:
   a housing cover with a position sensor; and
   a housing body having disposed therein an electric drive motor and an output shaft having a position transducer, the housing cover and the electric drive motor being connected via at least one electrical plug connection arrangement including a plug blade and an opposite plug clamp having a plug-in slot;
   wherein the housing body and the housing cover include a positioning arrangement having a positioning pin and a positioning bore configured to receive the positioning pin, and wherein, the at least one electrical plug connection arrangement includes, on a side of the plug clamp, a plug blade guide with a guide slot arranged in parallel with the plug-in slot and a plug-in axis of the positioning arrangement.

2. The electrical internal combustion engine actuating arrangement as recited in claim 1, wherein in a radial direction, the positioning arrangement is arranged closer to the position sensor than to the at least one electrical plug connection arrangement.

3. The electrical internal combustion engine actuating arrangement as recited in claim 1, wherein the positioning pin is configured to engage in a force fit engagement in the positioning bore.

4. The electrical internal combustion engine actuating arrangement as recited in claim 1, wherein the positioning pin is at least triangular.

5. The electrical internal combustion engine actuating arrangement as recited in claim 1, wherein the positioning bore is cylindrical.

6. The electrical internal combustion engine actuating arrangement as recited in claim 1, wherein the separate plug blade guide is disposed on either respective longitudinal side of the opposite plug clamp.

7. The electrical internal combustion engine actuating arrangement as recited in claim 1, further comprising a guide body, wherein the guide body defines the respective guide slot and where the guide body is formed integrally with at least one of the housing cover and the housing body.

8. The electrical internal combustion engine actuating arrangement as recited in claim 7, wherein the guide body includes, at a distal guide slot end thereof, an insertion funnel.

9. The electrical internal combustion engine actuating arrangement as recited in claim 1, wherein the guide slot protrudes distally beyond the plug-in slot.

10. The electrical internal combustion engine actuating arrangement as recited in claim 1, wherein a width of the plug blade is larger than a distance between an outer distance of at least one of the guide slot to the plug-in guide slot and two guide slots.

11. The electrical internal combustion engine actuating arrangement as recited in claim 1, wherein a width of the guide slots is larger than 0.85 times a thickness of the plug blade.

12. The electrical internal combustion engine actuating arrangement as recited in claim 11, wherein the width of the guide slots is larger than 1.0 times the thickness of the plug blade.

13. The electrical internal combustion engine actuating arrangement as recited in claim 1, wherein two electrical plug connection arrangements are provided.

14. The electrical internal combustion engine actuating arrangement as recited in claim 1, wherein the opposite plug clamp is disposed on a side of the housing cover.

* * * * *